United States Patent [19]

Kosmowski et al.

[11] 4,379,308

[45] Apr. 5, 1983

[54] APPARATUS FOR DETERMINING THE PARAMETERS OF FIGURES ON A SURFACE

[75] Inventors: Wojciech Kosmowski, San Juan Capistrano; Richard Eddy, Gardena; Martin O'Neill, Placentia, all of Calif.

[73] Assignee: Cooper Industries, Inc., Houston, Tex.

[21] Appl. No.: 335,097

[22] Filed: Dec. 28, 1981

Related U.S. Application Data

[63] Continuation of Ser. No. 124,443, Feb. 25, 1980, abandoned.

[51] Int. Cl.$^3$ .............................................. H04N 7/18
[52] U.S. Cl. ................................... 358/106; 356/394; 358/101; 358/107; 364/515
[58] Field of Search ...................... 358/101, 106, 107; 364/515; 356/394

[56] References Cited

U.S. PATENT DOCUMENTS

| | | | |
|---|---|---|---|
| 3,690,747 | 9/1972 | Vaughn | 352/87 |
| 3,976,982 | 8/1976 | Eiselen | 364/900 |
| 4,052,603 | 10/1977 | Karlson | 364/120 |
| 4,070,710 | 1/1978 | Sukonick | 364/900 |
| 4,148,061 | 4/1979 | Lemelson | 358/101 |
| 4,189,743 | 2/1980 | Schure | 358/93 |

OTHER PUBLICATIONS

*Federation Proceedings,* vol. 33, No. 12, Dec. 1974, pp. 2365-2368, "Image Processor for Biomedical Research-"—B. H. McCormick et al.

*Primary Examiner*—Howard Britton
*Attorney, Agent, or Firm*—Spensley, Horn, Jubas & Lubitz

[57] ABSTRACT

The disclosed apparatus determines the parameters, such as size, shape, and position, of figures on a surface. It includes a camera means generating a video signal. A table assembly adjusts the position of the camera and surface on the table with respect to each other as specified by position signals. Control circuitry generates the position signals so as to bring at least a portion of a figure into the camera's field of view. The video signal generated when this portion of a figure is in view is used by processing circuitry to determine the figure's parameters.

In one embodiment, the expected parameter values for a figure are retrieved from storage circuitry and compared against the parameter values as determined by the processing circuitry. If the parameter values are out of range, an error signal is generated. Error data may be recorded or transmitted to an external device for statistical analysis.

11 Claims, 7 Drawing Figures

APPARATUS FOR DETERMINING THE PARAMETERS OF FIGURES ON A SURFACE

This is a continuation of application Ser. No. 06/124,443, filed Feb. 25, 1980.

BACKGROUND OF THE INVENTION

1. Field of the Invention

The invention relates to an apparatus for determining the physical parameters of figures on a surface, for example the size and position of apertures in a printed circuit board.

2. Description of Prior Art

There are numerous instances in which the physical parameters of figures on a surface must be determined. For example, nearly every manufacturing process includes at one point or another an inspection of the product being manufactured. If the manufacturing process is highly automated, it is also desirable to automate the inspection step. Although the automation of an inspection process may be very difficult or costly to implement, particular types of products are quite amenable to automated inspection.

There have been several machines developed to automatically or semi-automatically inspect printed circuit boards (PCBs) to determine whether they have been manufactured to acceptable tolerances. The manufacturing of a printed circuit board requires the forming of hundreds or even thousands of precisely sized and positioned holes. Each hole must be formed and located to allow for the insertion of an electronic component lead into it or to allow an interconnection to be made to another layer of the PCB by placing electrically conductive material in the hole. If even one of the PCB holes is misaligned or missized, automatic insertion of the electronic components at a later stage of assembly may be disrupted or an improperly formed interconnection may render the PCB inoperative.

One apparatus for inspecting printed circuit boards requires an operator to manually insert a small probe sequentially into each hole in the PCB. When the probe is inserted in a hole, the position of the hole relative to a predetermined reference point is automatically determined by the apparatus. This apparatus has several disadvantages. It requires an operator to manually control the movement of the probe from one hole to the next. In addition, the insertion of the probe into a hole may damage the hole or the PCB. For instance, removal of the probe from the hole may lift a copper foil overlay which may surround the hole from the board. Also, such a machine does not permit measurement of the size of the hole.

Another apparatus for inspecting holes in a PCB uses collimated light beams which are projected through the hole from below the PCB. Optical detectors determine from the light exiting the hole whether the hole is within acceptable positon and/or size tolerances.

Although this apparatus has the advantage of not contacting the board during the inspection process, it does have certain disadvantages. A PCB may be wavy, resulting in holes which are not exactly perpendicular to the wavy surface of the board. This board waviness may be within acceptable tolerances, a permissible deviation, yet a collimated light beam apparatus may indicate that a hole is outside the acceptable range due to the non-perpendicular nature of the hole with respect to the surface. Another disadvantage of such an apparatus is that it cannot be used to measure the parameters of a blind hole, i.e., a hole which does not pass through the board. Another disadvantage to this apparatus is that it may be used only to inspect holes. It would be desirable to also be able to inspect other features or figures on the surface of the board, i.e., terminal pads and copper foil conductors.

Many apparatus which determine the values for parameters of a figure encounter difficulties when the figure is formed by a hole in the surface. For instance, the location of a circular hole may be mathematically referenced with respect to the geometric center of the circle which the hole forms on the surface. However, to determine the center of a circular hole in a surface is complicated by the removal of the surface material at the hole's center. Once the hole is formed, its center can be determined only by inspecting its perimeter. Determining the hole's center from its perimeter, although mathematically straightforward, has been a difficult task for many prior art apparatus.

It is an object of the invention to provide an apparatus suitable for automatically inspecting a nominally flat surface, such as a PCB, to determine if figures on the surface have parameters, such as size, position and shape, within the acceptable margin of manufacturing tolerances. It is a further object of the invention to provide an apparatus for measuring the parameters of a hole in a PCB, even if a blind hole, without causing damage to the board by the inspection process. Another object is to compensate for the nonplanarity of a surface when figures on its surface are being inspected. An additional object is to provide data gathered on the parameters of figures on a surface to an external device for additional processing such as statistical analysis. Other objects will appear to those skilled in the art from the following description of a preferred embodiment.

SUMMARY OF THE INVENTION

These and other objects of the invention are achieved by a table apparatus which supports a camera and surface, such as a PCB, in an adjustable relationship with respect to each other. Upon receiving appropriate movement signals, the table apparatus adjusts the position of the surface and camera with respect to each other to bring a selected portion of the surface into focus in the view of the camera.

The camera is actuated to generate a video signal representation of the field of view before it.

Control circuitry generates appropriate movement signals to the table apparatus to bring any selected portion of the surface into view, the selected portion presumably containing a figure, such as a hole, whose parameters are to be measured or verified. When the figure is in the field of view of the camera, video circuitry, receives the video signal from the camera, and supplies a digital representation of the camera's field of view to processing circuitry, which determines the actual parameters of the figure.

If it is desired to verify the parameters of a figure, the acceptable range of parameters for each figure on the surface to be verified is stored in memory. The expected position of the figure may be accessed from the memory, and appropriate movement signals may be generated by the control circuitry to cause the table apparatus to bring the designated portion of the surface into the field of view of the camera. The actual position, size, and other parameters of the figure may then be determined by the processing circuitry and compared with the allowable parameter values.

In one embodiment of the invention, the video circuitry includes digitizer circuitry which processes the video signal generated by the camera and discriminates between portions of the video signal which represent featureless portions of the surface in view and portions which represent the figure being inspected. The output of the digitizer circuitry is a digital signal indicating such discrimination. The digital signal is periodically sampled to determine values for a grid of picture elements (pixels), each of which correspond to a fixed portion of the field of view of the camera. The pixel values are initially stored in a frame store memory until the entire grid of values has been determined. The grid of pixel values is then transferred via a system bus to processing circuitry which stores the grid of pixel values in its data memory for use while determining the parameters for a figure in the camera's field of view. The pixel grid values digitally represent the field of view of the camera.

In order to determine the size of a circular figure, the processing circuitry locates a pixel which is in the interior of the figure and near its anticipated center. Adjacent pixels in the same grid column as the center pixel are accessed to determine two "boundary" pixels, i.e., the two pixels in the same grid column as the center pixel, but which are the closest pixels to the center pixel not representing the interior of the figure being inspected. These two boundary pixels define a chord in the circular figure. The pixels representing the perpendicular bisector of this chord are inspected to determine a third boundary pixel corresponding to where the perpendicular bisector crosses the boundary of the circular figure. A simple mathematical computation from the grid addresses of these three boundary pixels determines the nominal size and position of the figure.

A circular figure larger than that able to be viewed at one time by the camera has several portions of its boundary viewed by the camera. The information gathered during each of the several inspections is combined by the processor circuitry with the movements necessary to view the several boundary portions to determine the actual position and size of the circular figure.

DETAILED DESCRIPTION OF PREFERRED EMBODIMENTS

While the invention will now be described with reference to determining parameters of apertures in PCBs, the scope, capabilities and usefulness of the invention is far broader than this limited application, as those skilled in this art will recognize.

Figure 1:
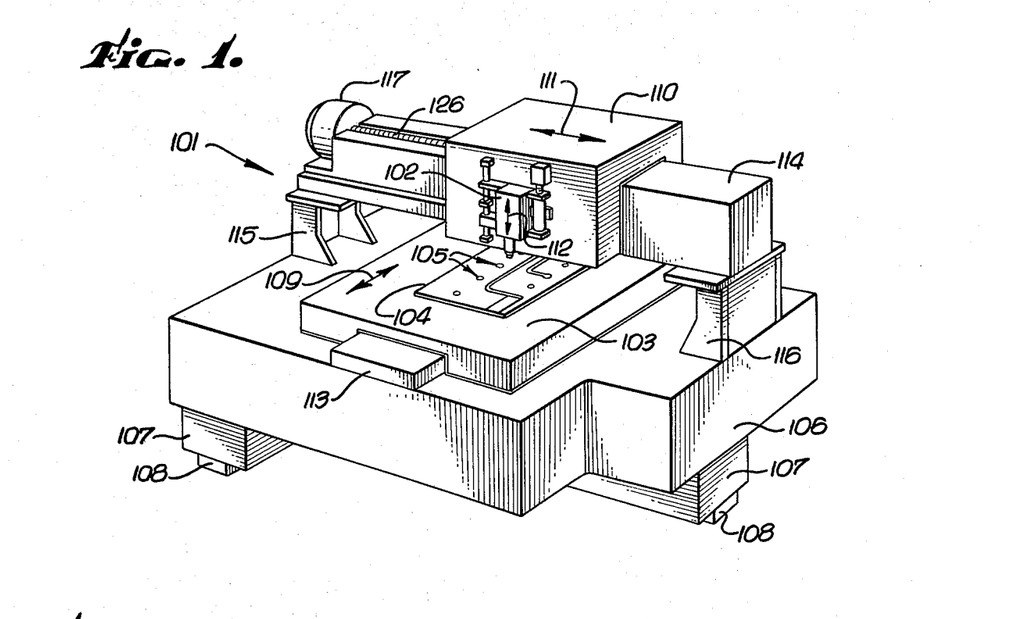
FIG. 1 is a perspective view of the major mechanical assembly used in one embodiment of the invention.

FIG. 1 is a perspective view of the mechanical assembly utilized in the preferred embodiment of the invention. A table apparatus 101 is provided to controllably position a camera 102 and a surface 104 on a work table 103 with respect to each other to allow positioning of selected portions of the surface 104 in the field of view of the camera 102.

The surface 104 may contain FIGS. 105 on the side facing the camera's field of view. The surface 104 is typically a printed circuit board or microelectronic photomask print. By appropriate illumination means, embodiments of which are described below, the surface 104 may be illuminated to ensure sufficient visual contrast between the surface 104 and FIGS. 105 to permit easy discrimination between a FIG. 105 and other portions of the surface 104.

The table apparatus 101 of the embodiment illustrated in FIG. 1 includes a base 106 of material sufficient to ensure that the various mechanical components of the table apparatus 101 are rigidly and stably positioned. A base 106 manufactured of granite has been found to provide the necessary mechanical rigidity and stability to the table apparatus 101. The base 106 is supported on legs 107, which include adjustable jack mounts 108. The jack mounts 108 allow the base 106 to be leveled.

In the embodiment of FIG. 1, the surface 104 is positioned on a work table 103 which is controllably moved in a "Y axis" direction 109. The camera 102 is mounted on a carriage 110. This carriage 110 is controllably moveable in a "X axis" direction 111. The camera device 102 is moveable with respect to carriage 110 in a "Z axis" direction 112. Movement of the X axis 111 and Y axis 109 allow positioning of the camera 102 and surface 104 with respect to each other to bring any selected portion of the surface 104 into the field of view of the camera 102. The camera 102 may be focused on the selected portion on the surface 104 in its field of view by appropriately controlled movement in the Z axis 112.

The work table 103 controllably slides on a Y axis guide rail 113. In order to ensure precise and essentially frictionless movement, the embodiment of FIG. 1 uses air bearings (not illustrated) between the work table 103 and Y axis guide rail 113. A lead screw and precision controlled servo motor assembly (not illustrated) may be used in a manner well known in the art to controllably move the work table 103 along its guide rail 113 in the Y axis 109.

An X axis guide beam 114 is positioned above the base 106 and work table 103 by supports 115, 116. In one embodiment, the guide beam 114 is made of granite, and the supports 115 and 116 are manufactured of stress-relieved cast iron. As with the Y axis, the X axis movement may be provided by a servo motor 117 and lead screw 126. As will be discussed below in conjunction with FIG. 5, to maximize accuracy of movement in each axis 109, 111, 112, a conventional position sensor device 520 (FIG. 5) is utilized to provide a feedback signal to the servo mechanisms. For instance, an optical position sensor device which detects minuscule increments of motion by counting lines in an optical grating which pass a photocell, provides the desired position determining capability.

Figure 2:
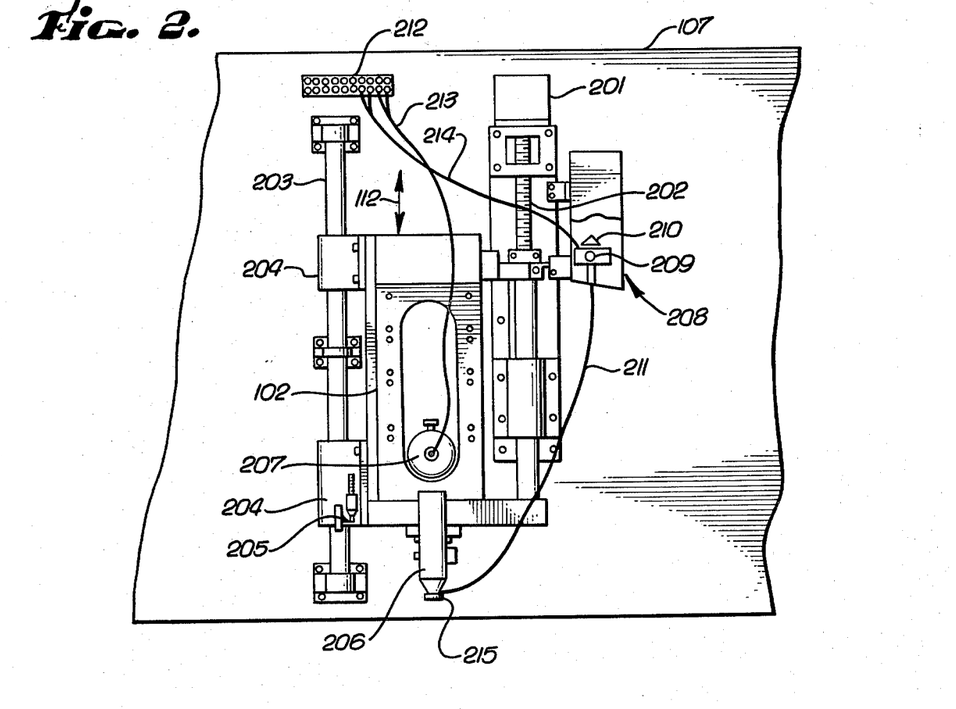
FIG. 2 is a plan view of a detail of the mechanical assembly associated with the camera of the embodiment illustrated in FIG. 1.

FIG. 2 is a plan view of a detail of the carriage 110 which includes the camera 102 and associated assemblies. A servo motor 201 rotates the lead screw 202, moving the camera 102 in the Z direction 112 on a guide shaft 203 and the lead screw 202. The camera 102 is mounted to the guide shaft 203 via guide blocks 204. In order to limit the amount of movement of the camera 102, a limit switch 205 is provided. Such a limit switch 205 ensures that the lens assembly 206 will not be damaged due to excessive pressure if it comes in contact with the surface 104.

The embodiment illustrated in FIG. 2 permits a choice of two illumination means for illuminating the field of view of the camera 102 to ensure adequate visual contrast between the surface 104 and FIGS. 105. A coaxial light source 207 is provided as one illumination means. A partially reflecting mirror (not illustrated) is included in the optical axis of the camera optics to direct light from the coaxial light source 207 directly, i.e. coaxially, upon an object in the camera's field of view.

An alternate illumination means is provided by the off-axis illumination source 208. A light 209 and reflector 210 directs light into one end of a set of optical fibers 211. The other end of the optical fibers surround the lens assembly 206 and provide an evenly distributed off-axis or non-coaxial illumination of the surface 104. In order to maximize the visual contrast between the surface 104 and a FIG. 105 to be inspected, it has been found desirable to allow the operator of this apparatus to adjust the amount and ratio of off-axis and coaxial illumination. Depending upon the reflectivity of the surface 104, whether the figures are formed by recesses in the surface 104 or designs on the surface 104, and other factors affecting the visual contrast between the FIGS. 105 and surface 104, the operator can appropriately adjust via a rheostat or other such means the ratio and amount of coaxial and off-axis illumination of the field of view of the camera 102 to maximize contrast.

Of course, a third illumination means may be provided which illuminates the opposite side of the surface 104. If the FIGS. 105 being inspected are actually holes through the surface 104, the illumination of the opposite side of the surface 104 may provide sufficient visual contrast between the surface 104 and the portion of the hole in the field of view of the camera 102.

The terminal block 212 and electrical conductors 213, 214 provide power to the coaxial 207 and off-axis 208 illumination means.

Certain surfaces, such as printed circuit boards, may not be sufficiently planar to permit a fixed focusing of the camera 102 above the work table 103. For instance, a deviation of as much as 0.001 inches or more in height of the surface 104 above the work table may occur between adjacent holes in a printed circuit board. In order to maximize the sharpness of focus of the portion of the surface 104 within the field of view of the camera 102, it has been found desirable to first calibrate the focusing of the camera 102 by having the operator of the apparatus manually focus the camera 102 upon a portion of the surface 104 containing a FIG. 105 to be inspected.

The lens assembly 206 includes a lens foot 215. The lens foot 215 is mechanically connected to a linear variable differential transformer (LVDT) (not shown), such as is manufactured by Schaevitz Engineering, Pennsauken, N.J. As the lens assembly 206 approaches the surface 104, the lens foot 215 contacts the surface 104, then moves upward with respect to the lens assembly 206. This repositioning causes the LVDT to vary a voltage used in the control circuitry for servo motor 201. The voltage value corresponds to the distance between the lens assembly 206 and the surface 104, as indicated by the amount of movement of the lens foot 215.

The operator manually focuses the camera 102 by adjusting, via a rheostat or othr such means, the null point in the control circuitry for servo motor 201, i.e., the LVDT voltage value which the control circuitry will seek to be generated by appropriate rotation of the servo motor 201. In In this manner, the camera 102 is moved a fixed focus distance above the surface 104, despite variations in height of the surface 104 above the work table 103.

In the embodiment of the invention illustrated in FIGS. 1 and 2, the camera 102 is a commercially available closed circuit television camera having a photo sensitive electron tube (not illustrated). This tube, in conjunction with conventional raster scan CRT circuitry, generates a video signal representative of the field view before the camera 102. This raster scan video signal is periodically sampled in a fixed and synchronous manner and digitized. In the preferred embodiment, the camera's field of view is decomposed into a 256×256 grid of picture elements (pixels). Such a pixel grid, in conjunction with camera optics magnifying 140X, has been found sufficient to accurately measure circular figures with diameter 0.0140 inches. Of course, a finer pixel grid or stronger optics will improve the accuracy and resolution of the apparatus without departing from the spirit or scope of the invention.

By appropriate adjustment of the coaxial 207 and off-axis 208 illumination means, the FIG. 105 which is being inspected is visually contrasted with the surface 104. Video circuitry discriminates between portions of the field of view of the camera 102 which represent a FIG. 105 and the featureless portions of the surface 104. The value assigned each pixel in the digitized grid representation of the field of view may be inspected to determine the particular pixel represents a portion of the figure being inspected.

Figure 3A:
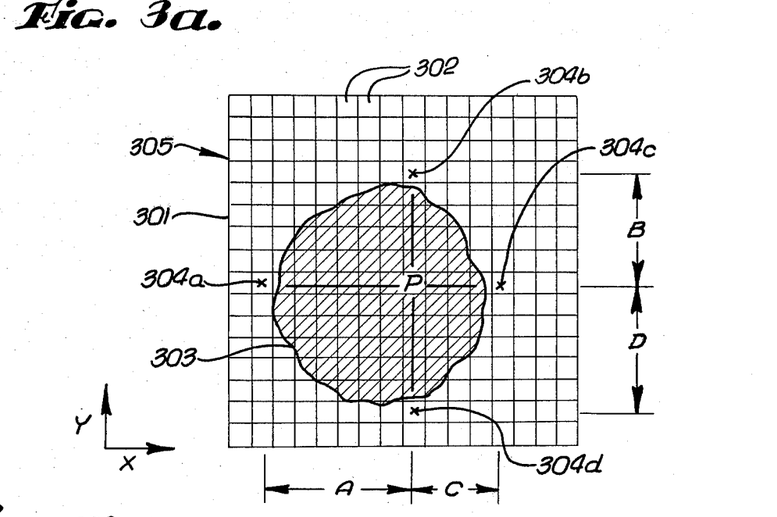
FIGS. 3a and 3b are representations of the digitized field of view of the camera when it is viewing a nominally circular figure, illustrating alternative processes for determining boundary picture elements for a circular figure.

FIG. 3a is a diagramatic representations of a pixel grid which represents the digitized field of view of the camera 102. The field of view 301 of the camera 106 is decomposed into pixels 302. Each pixel 302 represents a fixed and determinable portion of the camera's field of view 301. For illustrative purposes, a nominally circular FIG. 303, the interior of which is shown in hatching, is in focus in the field of view 301 of the camera 102. As previously mentioned, digital values are assigned to each pixel 302 depending on its illumination, which in turn depends on whether it represents a portion of the FIG. 303.

In the preferred embodiment, the digital values assigned to the pixels 302 correspond to a gray scale of sixteen levels in contrast. However, for processing purposes a threshold value is chosen and it is assumed that values representing darker shades than this represent a portion of the figure. The threshold value may be reassigned as necessary to ensure the most accurate definition of figures. For instance, it has been found that different threshold values are optimal for figures formed by drilling a hole in the surface than for figures formed by using a laser beam to evaporate the surface to form a hole.

In the preferred embodiment of the invention, processing circuitry determines the size and position of a nominally circular figure by inspecting the digital values assigned the pixels 302. Once the camera 102 has within its field of view 301 a purported circular FIG. 303, video circuitry determines the pixel values corresponding to the video signal representation of the camera's field of view 301. If it is anticipated that the FIG. 303 may be completely contained within the camera's field of view 301, processor circuitry accesses the value for a pixel representing a central portion of the camera's field of view 301. In FIG. 3a, this pixel is identified as P.

Assuming the FIG. 303 is not grossly out of its expected position on the surface the table assembly 101 will have positioned the camera 102 and surface 104 with respect to each other to bring into the camera's field of view 301 the desired FIG. 303, and pixel P will be within the FIG. 303, as indicated in FIG. 3a.

There are numerous mathematical algorithms which may be utilized to determine the nominal size and position of a circular FIG. 303 once at least 3 points on its boundary are located. Since each pixel 302 represents a well defined portion of the camera's field of view 305, the difference in grid addresses between two pixels 302 may be directly convertible into a physical distance upon suitable calibration of the pixel grid with respect to an image focused in the camera's field of view 301.

One embodiment of the invention uses the following process to determine the nominal size and position of a circular FIG. 303 completely contained within the field of view 301 of the camera 102. Processing circuitry inspects the values of pixels in the same grid row and grid column as the central pixel P until it locates the four pixels having values indicating that they are the closest pixels to the central pixel P but which are on the exterior of FIG. 303. These 'boundary' pixels 304a . . . 304d determine four boundary points of the FIG. 303.

As indicated in FIG. 3a, A and C are absolute values which represent the physical separation in the horizontal or X direction between the central pixel P and the boundary pixel 304a and 304c respectively. B and D are absolute values which indicate the physical separation in the vertical or Y direction of boundary pixels 304d and 304b from the central pixel P. The nominal diameter of the FIG. 303 in the Y axis is B+C, and in the X axis is A+D. If the central pixel P is near the actual center of the FIG. 303, the X diameter and Y diameter should be identical or nearly so. However, the larger of either A+C or B+D may be used as the nominal diameter of FIG. 303.

If the central pixel P is the actual center of the FIG. 303, then A=C and B=D. However, if the center of FIG. 303 is not at the central pixel P, then the displacement in the X direction from pixel P is (C−A)/2 and the displacement in the Y direction from pixel P is (B−D)/2. In this manner, the location of the center of FIG. 303 with respect to the center pixel P may be determined. If the position of the field of view 301 with respect to the surface 104 is known, the actual position on the surface 104 of the FIG. 303 is readily computed. As discussed below, the position of the field of view of the camera 102 with regard to the surface 104 may be determined by processing circuitry which accumulates the position adjustments of the camera 102 and surface 104 with respect to each other from a calibration point on the surface 104.

Of course, this algorithm to compute the nominal size and position of the FIG. 303 is not unique. An alternative mathematical algorithm would determine each pixel having a value representing an interior portion of FIG. 303. The centroid of these pixels may be computed, giving another estimate as to the position of the FIG. 303. As is clear, numerous other mathematical algorithms may be utilized to determine the size and/or position of a nominally circular FIG. 303 from the boundary of the figure.

Figures 3B, 4:
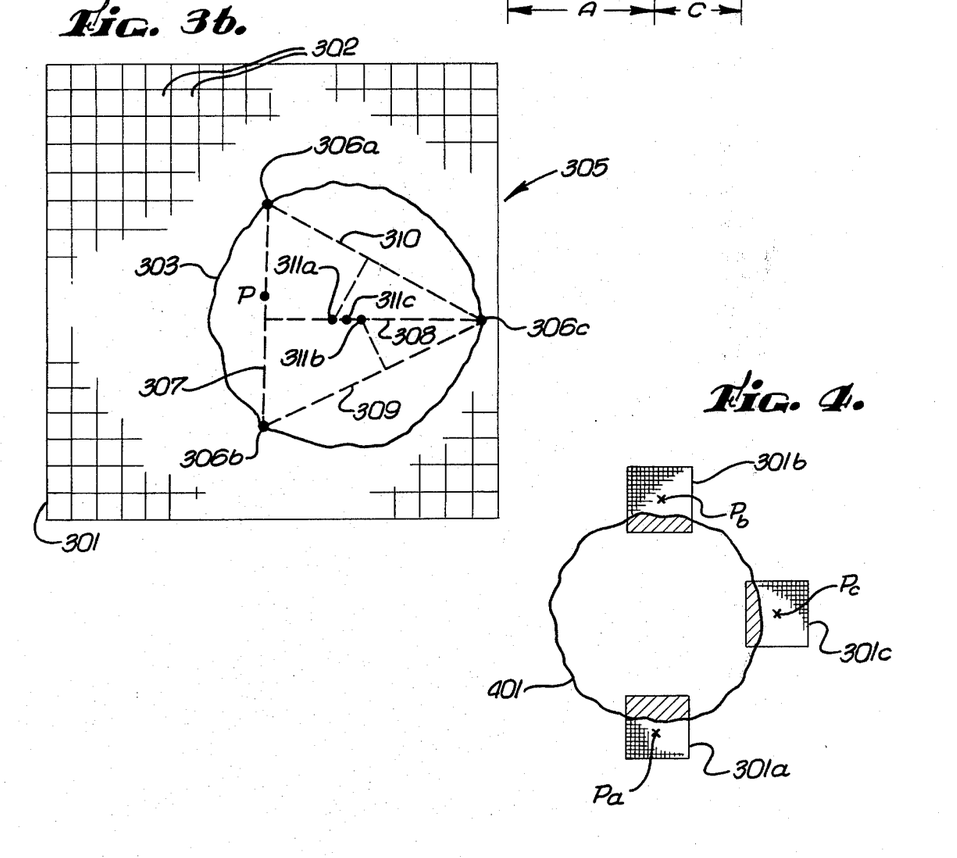
FIG. 4 is a diagramatic view of a circular figure which can not be completely contained within the field of view of the camera, illustrating the manner in which the camera's field of view may be repositioned by the table assembly of FIG. 1 in order to generate sufficient information for the processing circuitry to determine the parameters for the circular figure.

In the preferred embodiment, a more sophisticated mathematical computation has provided exceptional precision. FIG. 3b is a representation of the pixel grid 305 corresponding to the digitized field of view of the camera 102. For clarity, in FIG. 3b the interior of the nominally circular FIG. 303 is not hatched and the pixel grid is only suggested.

The values of pixels in the same grid column as the central pixel P are inspected to locate two boundary pixels 306a, 306b. These boundary pixels determine a chord 307. Processing circuitry accesses the pixels which represent portions of the camera's field of view on the perpendicular bisector 308 to this chord 307 until a third boundary pixel 306c is located. The third boundary pixel 306c determines two additional chords 309, 310. The processing circuitry then determines the pixels 311a, 311b on line 308 which represent the intersection with this line 308 of the perpendicular bisectors of chords 309 and 310. The pixel 311c intermediate pixels 311a and 311b is used as the center of the FIG. 303. The radius of the FIG. 303 is determined by computing the physical distance corresponding to the separation between pixel 311c and any of the boundary pixels 306a . . . 306c. The position of the FIG. 303 with respect to the central pixel P is determined by computing the distance and direction from pixel P to pixel 311c.

It is sometimes difficult to determine the pixel which appears to best represent a boundary of a figure, especially if the boundary is irregular due to burrs, etc. In one embodiment of the invention, if the expected shape and size of a figure is known, once a boundary pixel is located, adjacent pixels are also inspected to determine several boundary pixels. These pixels are then statisically fitted, such as by a least squares analysis, to the expected boundary shape to determine a statistically corrected boundary pixel.

The invention is not, of course, limited to measuring the parameters of only circular figures. Appropriate algorithms for computing the parameters of figures having other shapes will be equally obvious to those skilled in this art.

Although FIGS. 3a and 3b illustrates the capabilities of the invention to determine the parameters for figures which may be positioned completely within the field of view 301 of the camera 102, it is also possible for the invention to determine the parameters for figures which cannot be completely contained within the field of view 301 of the camera 102 at one time. FIG. 4 illustrates such a situation. A nominally circular FIG. 401 cannot be completely contained within the field of view of the camera 102. The surface 104 and camera 102 may be moved with respect to each other by the table assembly 101 such that plural nonidentical portions of the boundary of the FIG. 401 are within the field of view of the camera at various times. FIG. 4 illustrates the digital pixel representation of the camera's field of view 301a . . . 301c at three different times, with each grid representation having a corresponding center pixel Pa . . . Pc. The cross hatching in the field of views 301a . . . 301c indicates the portion of each field of view which represents an interior portion of the FIG. 401, and which would therefore have the corresponding pixels set to digital values indicating the pixels to be within a portion of the FIG. 401.

In order to determine the size and position of FIG. 401, the physical distances between the fields of view 301a . . . 301c must be determined. These distances may be obtained by the processing circuitry if it accumulates the physical distances associated with the position signals generated to cause the camera's field of view to be shifted, e.g. from 301a to 301b.

For each field of view 301a . . . 301c, the processor circuitry, in a manner similar to that described above with respect to FIG. 3b, may determine the distance between the associated center pixel, Pa . . . Pc respectively, by accessing pixel element values until a pixel is located which represents the boundary of the FIG. 401. Inasmuch as the center pixel may not be inside the FIG. 401, the boundary pixel is detected by its having a value different from the associated center pixel value, indicating a transition from the inside to outside of the FIG. 401 has been located, or vice versa.

Once the digital grid representation for the field of view of the camera 102 has been calibrated to allow conversion between grid addresses of two pixels and the physical distance between the corresponding positions of the camera's field of view, and once the position signals to the table apparatus have been calibrated to allow conversion to physical repositioning of the camera's field of view with respect to the surface 102, the relationship of the boundary pixels of FIG. 401 with respect to each other may be readily computed by the processing circuitry, resulting in the actual size and position of the FIG. 401.

The calibration of the pixel grid is performed by the processing circuitry. It compares the grid address separation of the boundary pixels when the pixel grid values represent a figure having known parameter values. Similarly, the processing circuitry may calibrate the movement signals to the table apparatus by determining what movement signals need to be generated to move the camera's field of view with respect to the surface a known distance.

It is desirable, but not mandatory, that the boundary portions of FIG. 401 which are inspected be maximally separated. This ensures that the boundary pixels of each field of view 301a . . . 301c are widely separated, which improves the accuracy of the measurement. Although it is mathematically possible to compute the size and position of a circular figure once any three distinct boundary points are known, in practice the effects of the granularity of the pixel grid representation of the camera's field of view, and the deviations due to burrs, etc., of the figure from a perfect circle are minimized by determining boundary pixels which are widely spaced apart on the boundary of the FIG. 401.

Although the invention determines the parameters of figures which may not be completely contained in the field of view of the camera 102, the mechanical repositioning of the surface 104 and camera 102 with respect to each other by the table apparatus 101 in order to bring several portions of the figure's boundary into the camera's field of view does consume additional time. In addition, mechanical inaccuracies in positioning of the work table 103 and camera 102 with respect to each other may cause inaccuracies in the determination of the parameters of the figure. In compensation, of course, a larger figure usually need not be measured as precisely as a smaller figure.

Figure 5:
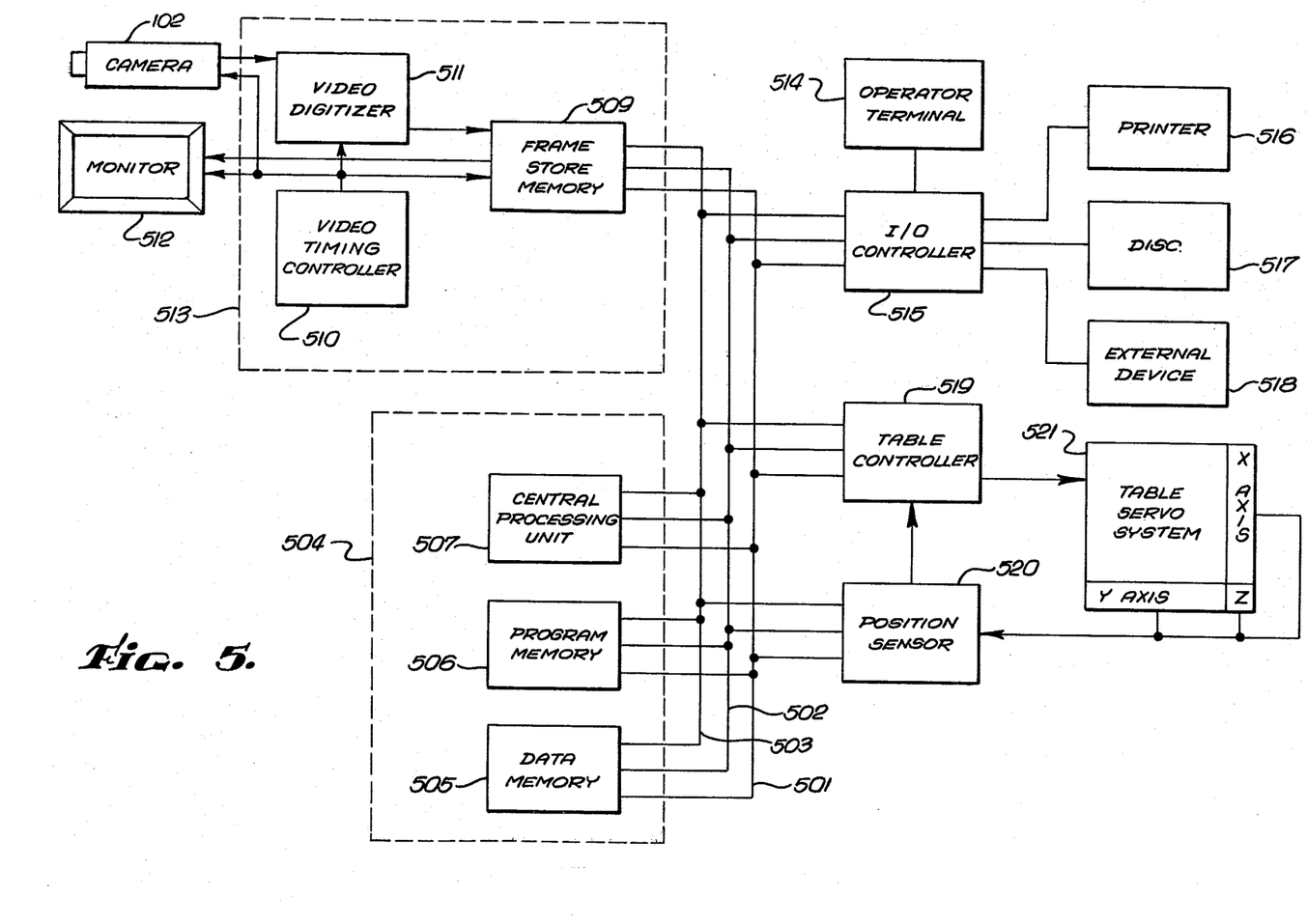
FIG. 5 is an electronic block diagram schematic of the electronic circuitry for one embodiment of the invention.
Figure 6:
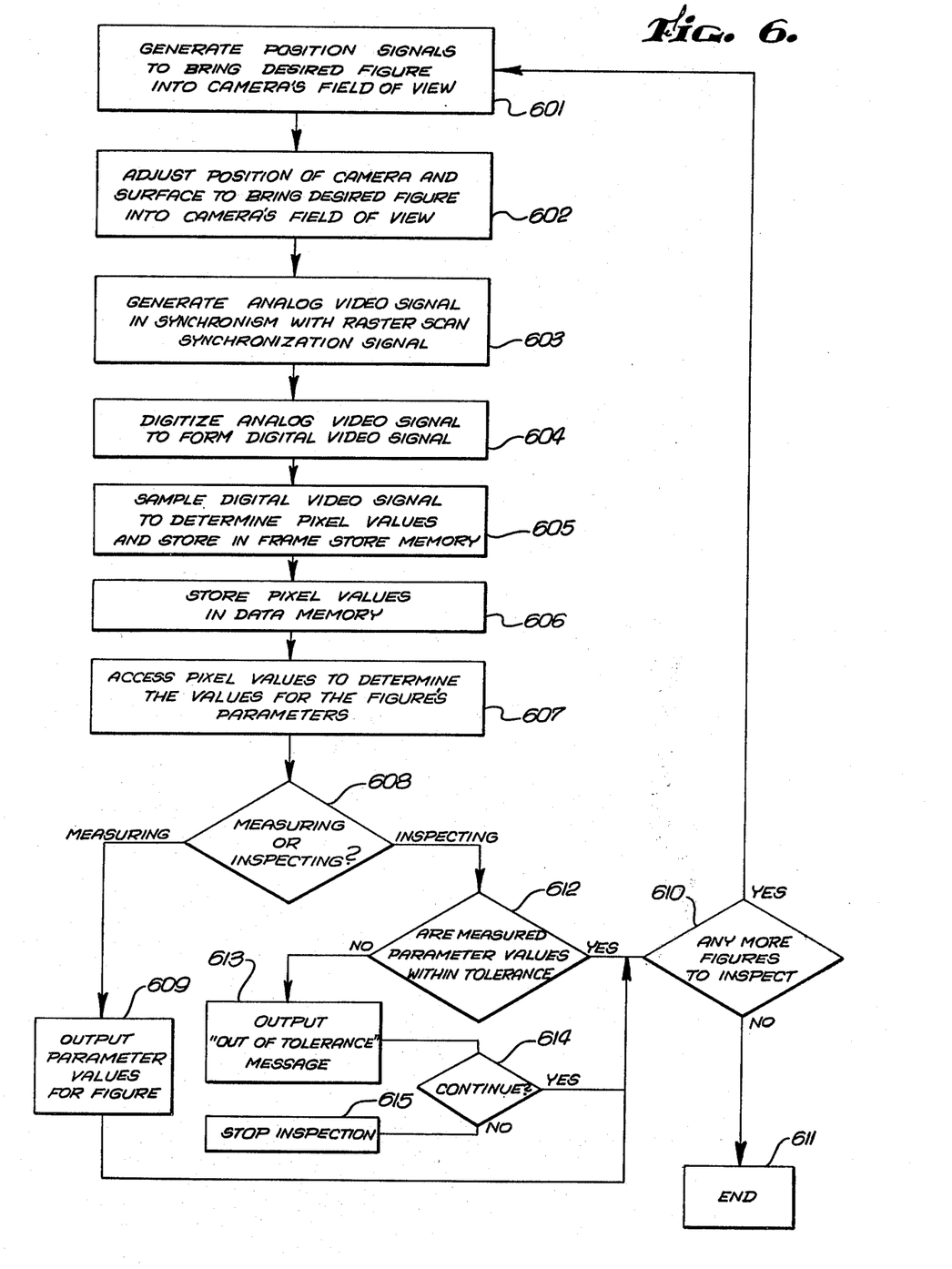
FIG. 6 is a flow chart representation of the processing steps performed by the circuitry of FIG. 5 to measure or inspect figures on a surface.

FIG. 5 is an electronic block diagram schematic of a preferred embodiment of the electrical circuitry usable in the invention. FIG. 6 is a flow chart diagram illustrating the order of the major processing steps performed by the electrical circuitry of FIG. 5.

As shown in Process block 601, the figure whose parameters will be measured must be brought into the field of view of the camera 102. In order to accomplish this, processing circuit 504 provides position signals to a table controller 519 which reformats the signals to generate appropriate movement signals to the table servo system 521 to bring the desired figure into the field of view of the camera 102, as indicated in process block 602. The camera 102 then generates an analog video signal which is time synchronized with raster scan synchronization signals generated by a video timing controller 510 (Process block 603). This analog video signal is provided to a video digitizer 511, which digitizes the analog video signal to form a digital video signal, as indicated in process block 604.

The digital video signal is provided to a frame store memory 509, which samples the digital video signal to determine the appropriate pixel values for the pixel grid and temporarily store them, as indicated in process block 605. As specified in process block 606, these pixel values are then transferred via buses 501, 502, 503 to the processing circuitry 504 for storage. The processing circuitry 504 accesses the pixel values to determine the parameter values for the figure which is in the camera's field of view (Process block 607).

Program logic in the processing circuitry 504, determines whether the apparatus is being used to measure a figure's parameters or to inspect them against predetermined tolerances (Process block 608). If the apparatus is being used to measure parameters for figures, the computed values for the figure's parameters may then be output, as indicated by process block 609. The processing circuitry 504 may output these parameter values by forwarding the information via the buses 501, 502, 503 to an I/O controller 515, which interfaces to an operator terminal 514, a printer 516, a disc 517, or any other appropriate external device 518 suitable for output.

As indicated in Process block 610, if there are no more figures to inspect, the measurement cycle is concluded (Process block 611). On the other hand, if additional figures should be inspected, the processing circuitry generates new position signals to bring the next figure to be inspected or measured into the camera's field of view (Process block 601).

Returning to Process block 608, if the apparatus is being used to inspect figures on a surface, the processing circuitry compares the measured parameter values of the figure to previously specified parameter tolerances (Process block 612). If a parameter for the figure is not within tolerance, the processing circuitry 504 outputs an appropriate message to flag the surface being inspected as having a figure with a parameter outside acceptable tolerance (Process block 613). As indicated in Process block 614, further inspection of the surface can then be suspended (Process block 615), or continued (Process block 610), depending on the mode of operation chosen by the operator.

On the other hand, if the parameter values measured for the figure are within acceptable tolerances, the processing circuitry 504 determines, as previously discussed, whether there are additional figures to be inspected (Process block 610). If there are no additional figures to inspect, the inspection process is terminated (Process block 611). Otherwise, additional position signals are generated to bring the next figure to be inspected into the camera's field of view. (Process block 601).

Although FIG. 6 describes the major processing steps performed by the circuitry elements of FIG. 5, the electronic block diagram schematic of FIG. 5 specifies the various electronic interconnections required among the various circitry elements to perform the indicated processing steps.

The numerous circuitry elements of the invention are interconnected via a bus structure 501, 502, 503. Control bus 502 is utilized to pass control signals between various circuitry elements. Data bus 501 is utilized in combination with the other buses, to transfer data values between various circuitry elements. Address bus 503 is utilized to pass memory addresses between the program memory 506 or data memory 505 and the other circuitry elements. Such bus structures are well known in the industry, and allow considerable flexibility in the development of additional capabilities and improvements to the invention.

Processing circuitry 504 provides a means for determining the parameters of figures at least partially within the field of view of the camera 102. In one embodiment, the processing circuitry includes a central processing unit 507, such as a PDP-11/04 minicomputer, manufactured by Digital Equipment Corporation. This minicomputer is a conventional and readily obtained device. Of course, the invention is not limited to the use of only this particular minicomputer in the processing circuitry 504 of the invention, inasmuch as almost any programmable computer could be appropriately configured to provide the necessary processing capabilities. In addition, those skilled in the art may use hard wired digital logic to perform the necessary processing functions of the invention without departing from the scope of the invention.

If the processing circuity 504 includes a programmable central processing unit 507, it will also include program memory 506 and data memory 505. The program memory 506 is preferably read/write memory for storage and retrieval of control instructions for the central processing unit 507. However, it may also be read only memory. Such memory devices are commercially available.

The data memory 505 is used by the central processing unit 507 to store and retrieve various data values while determining the parameters of a figure. Such values include the expected values for parameters, such as size, position and shape of each figure to be inspected. The processing circuitry 504 accesses the expected position of each figure to be inspected and generates appropriate position signals to the table controller 519. The table controller 519 uses these position signals, as described below, to move the position of the camera 102 and surface 104 with respect to each other so as to bring the portion of the surface 104 which should contain the figure of interest into the field of view of the camera 102.

Video circuitry 513 interfaces with the camera 102, a CRT monitor for use by an operator, and the buses 501 . . . 503. The video circuitry 513 processes the video signal representation of the field of view of the camera 102, and assigns values to the pixels in the pixel grid to provide a digital representation of the camera's field of view. The pixel values are transferred via the buses 501 . . . 503 from the video circuitry 513 to the processing circuitry 504 for storage and processing.

In addition, the video circuitry 513 may provide an appropriately generated raster scan video signal to an operator's CRT monitor to assist the operator in operating the apparatus.

As previously mentioned, the camera 102 includes a photosensitive electron tube (not illustrated). The video timing controller 510 generates raster scan synchronization signals in a conventional manner and provides them to the camera 102. The synchronization signals are used by the camera 102 to generate a analog video signal. This analog video signal is a raster scan representation of the optical image focused on the photosensitive surface of the camera's tube by the lens assembly 206.

The raster scan synchronization signals generated by the video timing controller 510 are also used by the video digitizer 511 and frame store memory 509. The video digitizer 511 is a commercially available product. For instance, View Engineering, Chatsworth, Calif. and Colorado Video, Boulder, Colo. manufacture electronic devices suitable for use as the video digitizer 511 of the preferred embodiment.

The major function of the video digitizer circuitry 511 is to generate a digital video signal which is a digital representation of the view before the camera 102. As previously discussed, it is the digital video signal which is used to discriminate between portions of the camera's field of view which represent a FIG. 105 and other portions of the FIG. 104. The digital video signal is a raster scan signal, whose digital values can be associated with a particular portion of the camera's field of view by reference to the raster scan synchronization signals generated by the video timing controller 510.

The video digitizer 511 provides the digital video signal to a frame store memory 509. The frame store memory 509 of the preferred embodiment is a commercial product, available, for instance, from the previously mentioned Colorado Video. The video timing controller 510 also provides the frame store memory 509 with the raster scan synchronization signals. The frame store memory 509, upon receiving an appropriate request from the processing circuitry 504, via the buses 501, 502, 503, samples a raster frame of the digital video signal to determine the values for a grid of picture elements. The frame store memory 509 uses the raster scan synchronization signals to correlate in time the digital video signal with the corresponding pixel in the pixel grid.

During analysis of a raster frame portion of the digital video signal, the frame store memory 509 stores in its memory the pixel values as it determines them. Once the entire grid of pixel values as been determined, the camera 102 and surface 104 may be repositioned with respect to each other to bring the next figure into view. The transfer of the pixel grid values to the processing circuitry 504 and the determination of the figure's parameters may be performed during the time the next figure is being brought into view. This overlap of operations increases the inspection rate of the inventive apparatus.

A conventional CRT monitor 512 is provided to display the pixel grid values to an operator. The frame store memory 509 generates a video signal for the monitor 512 which, in conjunction with the raster scan timing signals generated by the video timing contoller 510, allows the operator to observe the camera's field of view as it has been reformatted by the video digitizer 511 and frame store memory 509.

After the processing circuitry 504 requests a raster frame of the digital video signal to be used to determine the pixel grid values, the resulting values are forwarded via the buses 501 . . . 503 by the frame store memory 509 to the processing circuitry 504 for storage in the data memory 505, and subsequent use by the central processing unit 507 while determining the figure's parameters.

The table servo system 521 includes servos to perform the X, Y, and Z axis table movements of the table apparatus 116. As previously discussed, the carriage 110 is controllably moved by the table controller in the X axis 111 via a servo motor 117 and lead screw 126. Similar servo motors and lead screw arrangements are used in the Y axis 109 and Z axis 112.

The table controller 519 provides movement signals to the table servo system 521. The gross movement of the elements of the table apparatus 101 is specified by the table controller 519 to the table servo system 521 in accordance with desired position information received via the buses 501, 502, 503.

In the preferred embodiment of the invention, either an operator terminal 514 or the processing circuitry 504 provides, via the busses 501 . . . 503, the desired position information. The desired position information specifies the desired position of the camera's field of view and surface 104 with respect to each other. The operator of the apparatus may enter appropriate commands via the terminal 514 to cause a desired movement by the table servo system 521. This operator controlled table movement capability is advantageous during calibration of the apparatus inasmuch as it allows the operator to bring a fixed "reference" figure which has known parameter values into focus in the camera's field of view. The processing circuitry 504 uses the reference figure parameters to appropriately scale the parameters of the other figures on the surface 104. For instance, the position of other figures on the surface may be specified with respect to the position of the reference figure. The size and shape of the reference figure determines appropriate scaling factors for converting pixel grid addresses to actual physical lengths.

The processing circuitry 507 aligns the X axis 111 and Y axis 109 movements of the table assembly with the horizontal and vertical pixel grid addresses by comparing the pixel grid representations of the camera's field of view of two references figures which are positioned a known distance and direction from each other.

A position sensor 520 determines the precise movement of the carriage 110 and work table 103 which has been made in the X 111 and Y axis 109. The position sensor 520 provides a feedback signal to the table controller 519, ensuring that the movement signals provided the table servo system 521 by the table controller 519 will cause the desired positioning of the camera 102 with respect to the surface 104.

In one embodiment of the invention, the position sensor 520 in the X axis 111 and Y axis 109 included an optical grating and photoelectric cell. For instance, in the X axis 111, the photoelectric cell may be attached to the carriage assembly 110, and the optical grating may be affixed to the X axis guide beam 114. Movement of the carriage 110 with respect to the guide beam 114 causes an corresponding signal to be generated by the photoelectric cell in accordance with the movement of the grating before the photoelectric cell. Conventional counting circuitry accumulates the number of grating lines which pass by the photoelectric cell to compute the actual position of the carriage 110 with respect to the guide beam 114. Such an optical measuring system is well known in the art, and provides a highly accurate measurement of movement of the carriage 110 with respect to the guide beam 114. The accuracy of such systems are limited by the fineness of the optical grating. Similar methods are utilized in the other axis.

An I/O controller 515 provides an interface between the processing circuitry 504 and various peripherals 514 . . . 518. The I/O controller suitably reformats signals received on the buses 501 . . . , 503 as necessary to transfer information between a peripherals 514 . . . 518 and the buses 501 . . . 503. The peripherals shown in FIG. 5 are for illustrative purposes only, inasmuch as any other conventional peripheral may be interfaced via an appropriate I/O controller to the buses 501 . . . 503.

In the embodiment illustrated in FIG. 5, an operator terminal 514, such as a CRT and keyboard, is used by an operator to enter various data into the data memory, to request certain operations such as calibration to be performed, and so forth. In addition, the processing circuitry 504 communicates with the operator by transferring messages and data to the operator terminal 514. A printer 516 provides a printout of information concerning the operation of the invention, including, if desired, the measured parameters for each figure.

A direct access memory storage unit, such as a disc 517, maintains an archival copy of the program memory 506 in the event of power failure. In addition, disc 517 may contain the expected parameters for a number of surfaces. For instance, when the invention is utilized to inspect printed circuit boards, the disc 517 may contain the allowable range of size and positions for each aperture in several types of printing circuit boards. When a particular type of board is to be inspected, the corresponding information on the board type is transferred from the disc 517 via the I/O controller 505 to the data memory.

Due to the versatility of the invention, in certain embodiments the processing circuitry 504 provides the measured parameters of FIGS. 105 on the surface 104 to an external device 518 via the I/O controller 515. Such an external device may, for example, be a computer programmed to statistically analyze the deviations in measured figure parameters for a batch of PCBs. By inspecting a number of boards, random appearing deviations from desired parameter values may be statistically recognizable, and appropriate modifications to the production process may be initiated.

In one embodiment of the invention, the data memory 505 stores the allowable range of parameter values for each FIG. 105 to be inspected on a surface 104. For instance, the permissable diameter tolerances and positional variation of each aperture in a printed circuit board may be stored in the data memory 505. The processing circuitry 504 supplies via the buses 501 . . . 503, appropriate position signals to the table controller 519 to cause it to generate movement signals to the table servo system 521, bringing at least a portion of each aperture serially into view of the camera 102. The frame store memory 509 then provides, via the buses 501 . . . 503, the processing circuitry 504 the digital values for pixels in the grid representation of the camera's field of view. As previously discussed, the processing circuitry 504 may inspect the values of the pixel grid by accessing the pixel values in the data memory 505, and determine via any appropriate mathematical algorithm a nominal size and position of each aperture.

By comparing the size and position of each aperture as measured with respect to the allowable range in these values, the processing circuitry 504 determines whether the printed circuit board has been manufactured within the specified tolerances. If an aperture is out of tolerance the processing circuitry 504 may so indicate it to the operator via the operator terminal 514 or printer 516. In this manner, an automatic inspection of a surface such as a printed circuit board is accomplished.

Although only a limited number of embodiments of the invention have been discussed herein, it will be readily apparent to persons skilled in the arts that certain changes and modifications may be made without departing from the spirit of the invention. Accordingly, the foregoing disclosure, description, and figures are for illustrative purposes only, and do not in any limit the invention, which is defined only by the claims.

We claim:

1. An inspection apparatus for determining parameters of a generally circular figure on a surface, comprising:

camera means for generating a video signal representative of the field of view before said camera means;

table means for supporting said camera means and said surface in an adjustable spaced position with respect to each other such that selected portions of said surface may be brought within said field of view, said table means accepting position signals to adjust said spaced position;

control means for generating position signals to bring at least a portion of said figure within said field of view and for supplying said position signals to said table means;

digitizer circuitry generating from said camera means video signal an associated digital signal which discriminates between portions of said video signal representing a portion of said figure within said field of view and other portions of said video signal;

sampling means for sampling said digital signal to determine associated values for a grid of picture elements, each said picture element corresponding to a fixed portion of said field of view and having a value indicating whether said corresponding fixed portion of said field of view includes a portion of said figure;

addressable storage means for storage and retrieval of said picture element values; and processing means, accessing said storage means, for determining the size and position of said figure from said picture element values associated with the video signal generated when said figure is entirely within said field of view of said camera means, wherein said processing means includes means for accessing said storage means to locate first and second boundary picture elements in a grid column, each representing distinct boundary portions of said figure; means for locating a midpoint picture element in the grid midway between said first and second boundary picture elements; means for accessing a third boundary picture element in the same grid row as said midpoint picture element, representing another distinct portion of said figure; and means for determining the size and center of said figure from the grid addresses of said three boundary picture elements.

2. An apparatus according to claim 1 wherein said table means includes:

a first guide rail;

a table supporting said surface and controllably slidable on said first guide rail along a first line;

a second guide rail disposed in a fixed position above and perpendicular to said first guide rail;

a carriage controllably slidable on said second guide rail along a second line; and a focusing means attached to said carriage and to which said camera means is attached, for controllably moving said camera means along a third line generally perpendicular to said second line to bring a portion of said surface within said field of view into focus.

3. An apparatus according to claim 1 further comprising:

storage means for storage and retrieval of expected size and position values for said figure; and verification means, coupled to said storage means and to said processing means, for comparing the determined size and position values of said figure against the expected values, and for generating a defect signal indicative of the results of said comparison.

4. An apparatus according to claim 1 wherein said processing means, in order to determine the center of said figure, further comprises:

means for determining the perpendicular bisector of the line between said first and third boundary picture elements; means for determining the perpendicular bisector of the line between said second and third boundary picture elements; means for determining the grid intersections of said perpendicular bisectors with the line between said third boundary picture element and said midpoint picture element; and means for locating a center picture element in the grid midway between said intersections.

5. An apparatus according to claim 1, further comprising:

focusing means for adjusting the position of said camera means and surface with respect to each other to bring the portion of said surface in said field of view into focus.

6. An apparatus according to claim 5 wherein said focusing means is configured to separate said camera means and said surface by a predetermined focus distance.

7. An apparatus according to claim 1 further comprising illumination means for illuminating said camera means field of view.

8. An apparatus according to claim 7 wherein said illumination means comprises:

a coaxial light supply, projecting light of controllable intensity in a direction generally perpendicular to said surface;

an off-axis light supply, projecting light of controllable intensity in directions not generally perpendicular to said surface; and mixing means for controlling the intensity of light generated by said coaxial and said off-axis light supplies to improve the contrast of said figure with respect to said surface.

9. An inspection apparatus for determining the size and position of generally circular holes in a printed circuit board, comprising:
  first digital storage means for storage and retrieval of expected hole locations and sizes;
  camera means for generating a video signal representative of the field of view before said camera means;
  control means for accessing said first digital storage means to recall at least one of said expected hole locations, and for generating position signals indicating a portion of the printed circuit board corresponding to a recalled expected hole location;
  table means, supporting said camera means and the printed circuit board in an adjustable spaced position with respect to each other, for accepting said position signals to adjust said spaced position of the printed circuit board to locate the expected hole location within the field of view of said camera means;
  video digitizing means for converting said video signal into a corresponding grid of digital picture elements, each corresponding to a fixed portion of said field of view, and each having a value indicating whether the corresponding fixed portion of said field of view includes a portion of a located hole;
  second digital storage means for storage and retrieval of said picture element values; and
  processing means, accessing said second digital storage means and coupled to said control means, for determining the size and position of a located hole from said position signals and from said picture element values associated with the video signal generated when said hole is entirely within the field of view of said camera means;
  verification means, coupled to said first digital storage means and to said processing means, for comparing the determined size and position values of a located hole against the expected values, and for generating an error signal indicative of the results of said comparison.

10. A printed circuit board inspection apparatus according to claim 9, wherein said processing means includes means for accessing said second digital storage means to locate first and second boundary picture elements in a grid column, each representing distinct boundary portions of a located hole; means for locating a midpoint picture element in the grid midway between said first and second boundary picture elements; means for accessing a third boundary picture element in the same grid row as said midpoint picture element, representing another distinct portion of a located hole; and means for determining the size and center of a located hole from the grid addresses of said three boundary picture elements.

11. A printed circuit board inspection apparatus according to claim 10, wherein said processing means, in order to determine the center of a located hole, further comprises:
  means for determining the perpendicular bisector of the line between said first and third boundary picture elements; means for determining the perpendicular bisector of the line between said second and third boundary picture elements; means for determining the grid intersections of said perpendicular bisectors with the line between said third boundary picture element and said midpoint picture element; and means for locating a center picture element in the grid midway between said intersections.

* * * * *